United States Patent
Gurvich et al.

(10) Patent No.: US 10,906,659 B2
(45) Date of Patent: Feb. 2, 2021

(54) STRUCTURED PANEL WITH STRUCTURAL REINFORCEMENT(S)

(71) Applicant: Rohr, Inc., Chula Vista, CA (US)

(72) Inventors: Mark R. Gurvich, Middletown, CT (US); Georgios S. Zafiris, Glastonbury, CT (US); Jeffrey A. Anderson, Chula Vista, CA (US); Jose S. Alonso-Miralles, Chula Vista, CA (US); Milan Mitrovic, Del Mar, CA (US); Terry Muy, Chula Vista, CA (US); George Hoehn, Oceanside, CA (US); Timothy Olson, La Jolla, CA (US)

(73) Assignee: Rohr, Inc., Chula Vista, CA (US)

( * ) Notice: Subject to any disclaimer, the term of this patent is extended or adjusted under 35 U.S.C. 154(b) by 467 days.

(21) Appl. No.: 15/943,963

(22) Filed: Apr. 3, 2018

(65) Prior Publication Data

US 2019/0300188 A1    Oct. 3, 2019

(51) Int. Cl.
*B64D 29/00* (2006.01)
*G10K 11/168* (2006.01)
*G10K 11/172* (2006.01)

(52) U.S. Cl.
CPC ............ *B64D 29/00* (2013.01); *G10K 11/168* (2013.01); *G10K 11/172* (2013.01)

(58) Field of Classification Search
CPC ..... B64D 29/00; G10K 11/172; G10K 11/168
See application file for complete search history.

(56) References Cited

U.S. PATENT DOCUMENTS

| 2,333,343 A | 11/1943 | Sendzimir |
| 3,011,602 A | 12/1961 | Ensrud et al. |
| 3,341,395 A | 9/1967 | Weber |

(Continued)

FOREIGN PATENT DOCUMENTS

| CN | 101649818 | 7/2011 |
| CN | 104723616 | 6/2015 |

(Continued)

OTHER PUBLICATIONS

EP search report for EP19166905.0 dated Sep. 16, 2019.
EP search report for EP19216015.8 dated May 26, 2020.
EP search report for EP19216189.1 dated May 26, 2020.

*Primary Examiner* — Forrest M Phillips
(74) *Attorney, Agent, or Firm* — Getz Balich LLC (57) ABSTRACT

A panel is provided for attenuating sound. This panel includes a perforated first skin, a second skin and a core. The core forms a plurality of cavities vertically between the perforated first skin and the second skin. The core includes an array of corrugations that include a first baffle, a second baffle and a first septum. The cavities include a first cavity formed longitudinally between the first baffle and the second baffle. The first cavity is fluidly coupled with perforations in the first skin. The first septum extends from the first skin and the first baffle to the second skin and the second baffle. The first septum divides the first cavity into fluidly coupled sub-cavities. At least one element of the panel includes at least one first rib and at least one second rib, the first rib extends along a first trajectory and the second rib extends along a second trajectory that is non-parallel with the first trajectory.

20 Claims, 11 Drawing Sheets

(56) References Cited

U.S. PATENT DOCUMENTS

| | | |
|---|---|---|
| 3,380,206 A | 4/1968 | Barnett |
| 3,439,774 A | 4/1969 | Callaway |
| 3,507,355 A | 4/1970 | Lawson |
| 3,542,152 A | 11/1970 | Adamson et al. |
| 3,639,106 A | 2/1972 | Yate |
| 3,640,357 A | 2/1972 | Kitching et al. |
| 3,734,234 A | 5/1973 | Wirt |
| 3,819,007 A | 6/1974 | Wirt et al. |
| 3,821,999 A | 7/1974 | Guess et al. |
| 3,831,710 A | 8/1974 | Wirt |
| 3,848,697 A | 11/1974 | Jannot et al. |
| 3,850,261 A | 11/1974 | Hehmann et al. |
| 3,910,374 A | 10/1975 | Holehouse |
| 3,948,346 A | 4/1976 | Schindler |
| 3,969,563 A | 7/1976 | Hollis, Sr. |
| 4,189,027 A | 2/1980 | Dean, III et al. |
| 4,240,519 A | 12/1980 | Wynosky |
| 4,859,517 A | 8/1989 | Hull |
| 5,431,980 A | 7/1995 | McCarthy |
| 5,498,462 A | 3/1996 | Darfler |
| 5,634,306 A | 6/1997 | Riegelman |
| 5,923,003 A | 7/1999 | Arcas et al. |
| 5,997,985 A | 12/1999 | Clarke et al. |
| 6,598,701 B1 | 7/2003 | Wood et al. |
| 6,725,541 B1 | 4/2004 | Holme et al. |
| 6,871,725 B2 | 3/2005 | Johnson |
| 6,949,282 B2 | 9/2005 | Obeshaw |
| 7,124,856 B2 | 10/2006 | Kempton et al. |
| 7,784,283 B2 | 8/2010 | Yu et al. |
| 7,814,658 B2 | 10/2010 | Akishev et al. |
| 7,878,229 B2 | 2/2011 | Nakajima et al. |
| 7,959,109 B2 | 6/2011 | Dasilva et al. |
| 7,963,362 B2 | 6/2011 | Lidoine |
| 7,971,684 B2 | 7/2011 | Ganite et al. |
| 3,025,122 A1 | 9/2011 | Gilcreest et al. |
| 8,245,815 B2 | 8/2012 | Valleroy et al. |
| 8,336,316 B2 | 12/2012 | Kirby |
| 8,413,922 B2 | 4/2013 | Porte et al. |
| 8,449,707 B2 | 5/2013 | Simmons et al. |
| 8,517,309 B2 | 8/2013 | Robinson |
| 8,544,598 B2 | 10/2013 | Gaudry et al. |
| 8,646,574 B2 | 2/2014 | Drevon et al. |
| 8,684,301 B2 | 4/2014 | Porte et al. |
| 8,733,501 B2 | 5/2014 | Porte et al. |
| 8,763,751 B2 | 7/2014 | Starobinski et al. |
| 8,776,946 B2 | 7/2014 | Todorovic |
| 8,820,477 B1 | 9/2014 | Herrera et al. |
| 8,955,643 B2 | 2/2015 | Liu |
| 9,704,467 B1 | 7/2017 | Nampy |
| 2011/0100747 A1 | 5/2011 | Hoetzeldt et al. |
| 2013/0266772 A1 | 10/2013 | Fujii |
| 2014/0034416 A1 | 2/2014 | Liu |
| 2014/0349082 A1 | 11/2014 | Tien |
| 2015/0110603 A1 | 4/2015 | Biset et al. |
| 2015/0284945 A1 | 10/2015 | Tien |
| 2015/0367953 A1 | 12/2015 | Yu et al. |
| 2016/0312709 A1 | 10/2016 | Nampy |
| 2017/0225764 A1* | 8/2017 | Nampy .................. B64C 1/40 |
| 2017/0229106 A1 | 8/2017 | Nampy |
| 2017/0301334 A1 | 10/2017 | Nampy |
| 2018/0142621 A1 | 5/2018 | Biset |
| 2018/0229829 A1 | 8/2018 | Pierick |

FOREIGN PATENT DOCUMENTS

| | | |
|---|---|---|
| FR | 2201010 | 4/1974 |
| GB | 1406844 | 9/1975 |
| RU | 2413654 | 6/2010 |

* cited by examiner

STRUCTURED PANEL WITH STRUCTURAL REINFORCEMENT(S)

BACKGROUND

1. Technical Field

This disclosure relates generally to structured panels and, more particularly for example, to a structured panel that attenuates sound generated by a gas turbine engine for an aircraft propulsion system.

2. Background Information

Acoustic panels may be used in various applications to attenuate noise. An acoustic panel, for example, may be configured with a nacelle of an aircraft propulsion system to attenuate noise generated by a gas turbine engine. Such an acoustic panel typically includes a honeycomb core connected between a perforated face skin and a solid, non-perforated back skin. The honeycomb core includes a plurality of resonating chambers. These resonating chambers are tuned by selecting a desired chamber length and, thus, core thickness that corresponds to a specific target frequency of noise to be attenuated. Increasing the core thickness, for example, will typically tune the resonating chambers for attenuating lower frequency noise. Conversely, decreasing the core thickness will typically tune the resonating chambers for attenuating higher frequency noise.

Recent trends in aircraft engine design such as higher bypass ratios, larger fan diameters, slower rotating fans and/or fewer number of fan blades have resulted in those aircraft engines generating relatively low frequency noise. Relatively strict space constraints for those engines, however, typically limit or prohibit increasing the thickness of an acoustic panel to tune its resonating chambers for such relatively low frequency noise. Reducing the thickness of the acoustic panel also has the concern of compromising structural integrity.

SUMMARY OF THE DISCLOSURE

According to an aspect of the present disclosure, a panel is provided for attenuating noise. This panel includes a perforated first skin, a second skin and a core. The core forms a plurality of cavities vertically between the perforated first skin and the second skin. The core includes an array of corrugations that include a first baffle, a second baffle and a first septum. The cavities include a first cavity formed longitudinally between the first baffle and the second baffle. The first cavity is fluidly coupled with perforations in the first skin. The first septum extends from the first skin and the first baffle to the second skin and the second baffle. The first septum divides the first cavity into fluidly coupled sub-cavities. At least one element of the panel includes at least one first rib and at least one second rib. The first rib extends along a first trajectory and the second rib extends along a second trajectory that is non-parallel with the first trajectory.

According to another aspect of the present disclosure, another panel is provided for attenuating noise. This panel includes a plurality of panel elements, which elements include a perforated first skin, a second skin and a core. At least one of the panel elements is configured with or otherwise includes a network of interconnected ribs. The core forms a plurality of cavities vertically between the perforated first skin and the second skin. The core includes an array of corrugations that include a first baffle, a second baffle and a first septum. The cavities include a first cavity formed longitudinally between the first baffle and the second baffle. The first cavity is fluidly coupled with perforations in the first skin. The first septum extends from the first skin and the first baffle to the second skin and the second baffle. The first septum divides the first cavity into fluidly coupled sub-cavities.

According to still another aspect of the present disclosure, still another panel is provided for attenuating noise. This panel includes a perforated first skin, a second skin and a core. The core forms a plurality of cavities vertically between the perforated first skin and the second skin. The core includes an array of corrugations that include a first baffle, a second baffle and a first septum. The cavities include a first cavity formed longitudinally between the first baffle and the second baffle. The first cavity is fluidly coupled with perforations in the first skin. The first septum extends from the first skin and the first baffle to the second skin and the second baffle. The first septum divides the first cavity into fluidly coupled sub-cavities. At least one element of the core is configured with or otherwise includes a network of interconnected ribs.

The first trajectory may be offset from the second trajectory by an acute angle.

The first trajectory may be perpendicular to the second trajectory.

The first rib may run into the second rib.

The first rib may be discrete from the second rib.

The element of the panel may also include at least one third rib. The third rib may extend along a third trajectory that may be non-parallel with the first trajectory.

The third trajectory may be parallel with the second trajectory.

The second rib and the third rib may each be coincident with the first rib.

The element of the panel may also include a fourth rib. The fourth rib may extend along a fourth trajectory that may be non-parallel with the second trajectory.

The first rib and the fourth rib may each intersect with the second rib and the third rib.

The element of the panel may be configured as or otherwise include an element of the core.

The element of the panel may be configured as or otherwise include the first baffle.

The element of the panel may be configured as or otherwise include the septum.

The element of the panel may be configured as or otherwise include the first skin.

The element of the panel may be configured as or otherwise include the second skin.

The core may also include a first wall and a second wall. The first cavity may be formed laterally between the first wall and the second wall. The element of the panel may be configured as or otherwise include the first wall.

The core may be configured from or otherwise include composite material.

The panel may be configured as a panel for a nacelle of an aircraft propulsion system.

The foregoing features and the operation of the invention will become more apparent in light of the following description and the accompanying drawings.

DETAILED DESCRIPTION

The present disclosure includes structured panels such as, but not limited to, acoustic panels for attenuating sound; e.g., noise. Each structured panel may include one or more structural reinforcements, such as rib structures, for increasing rigidity, strength, stability (i.e., resistance to buckling) and/or other metrics of structural integrity of that panel. For ease of description, the following disclosure will first describe a general panel configuration without structural reinforcements and then describe how one or more structural reinforcements may be added to one or more elements (e.g., components) of the panel to increase rigidity, strength, stability and/or other metrics of structural integrity of that panel.

Figure 1:
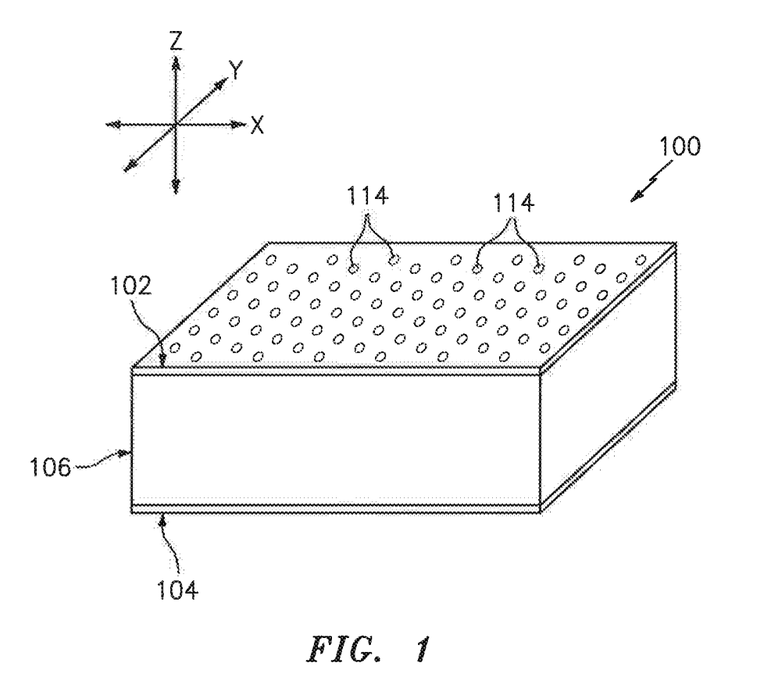
FIG. 1 is a perspective schematic illustration of a structured panel, in accordance with various embodiments.

FIG. 1 is a partial, perspective block diagram illustration of an acoustic panel 100 for attenuating noise. This acoustic panel 100 may be configured to attenuate noise generated by an aircraft propulsion system such as, for example, a turbofan propulsion system or a turbojet propulsion system. With such a configuration, the acoustic panel 100 may be configured with a nacelle of the propulsion system. The acoustic panel 100, for example, may be configured as or with an inner or outer barrel, a translating sleeve of a thrust reverser, a blocker door, etc. Alternatively, the acoustic panel 100 may be configured with another component/structure of the aircraft such as its fuselage or a wing. Furthermore, the acoustic panel 100 may be configured to also or alternatively attenuate aircraft related noise other than that generated by the propulsion system. The acoustic panel 100 of the present disclosure, however, may alternatively be configured for non-aircraft applications.

The acoustic panel 100 extends longitudinally along an x-axis. The acoustic panel 100 extends laterally along a y-axis. The acoustic panel 100 extends vertically along a z-axis. The term "vertical" is used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 100 may be curved and/or follow an undulating geometry. For example, the x-y plane and, thus, the acoustic panel 100 may be arcuate, cylindrical or conical with or without radial undulations. Thus, the vertical direction may change at different locations along the x-y plane; e.g., the vertical direction may be a radial direction for a cylindrical or conical acoustic panel.

The acoustic panel 100 includes a perforated first (e.g., face) skin 102, a solid non-perforated second (e.g., back) skin 104 and a cellular core 106. Briefly, the cellular core 106 is disposed and extends vertically between the first skin 102 and the second skin 104. The cellular core 106 is also connected to the first skin 102 and the second skin 104. The cellular core 106, for example, may be fused, adhered, welded, brazed and/or otherwise bonded to the first skin 102 and/or the second skin 104. The cellular core 106 may also or alternatively be mechanically fastened to the first skin 102 and/or the second skin 104. Alternatively, the cellular core 106 may be formed integral with the first skin 102 and/or the second skin 104 as a monolithic body using, for example, additive manufacturing. However, the present disclosure is not limited to any particular manufacturing methods.

Figure 2:
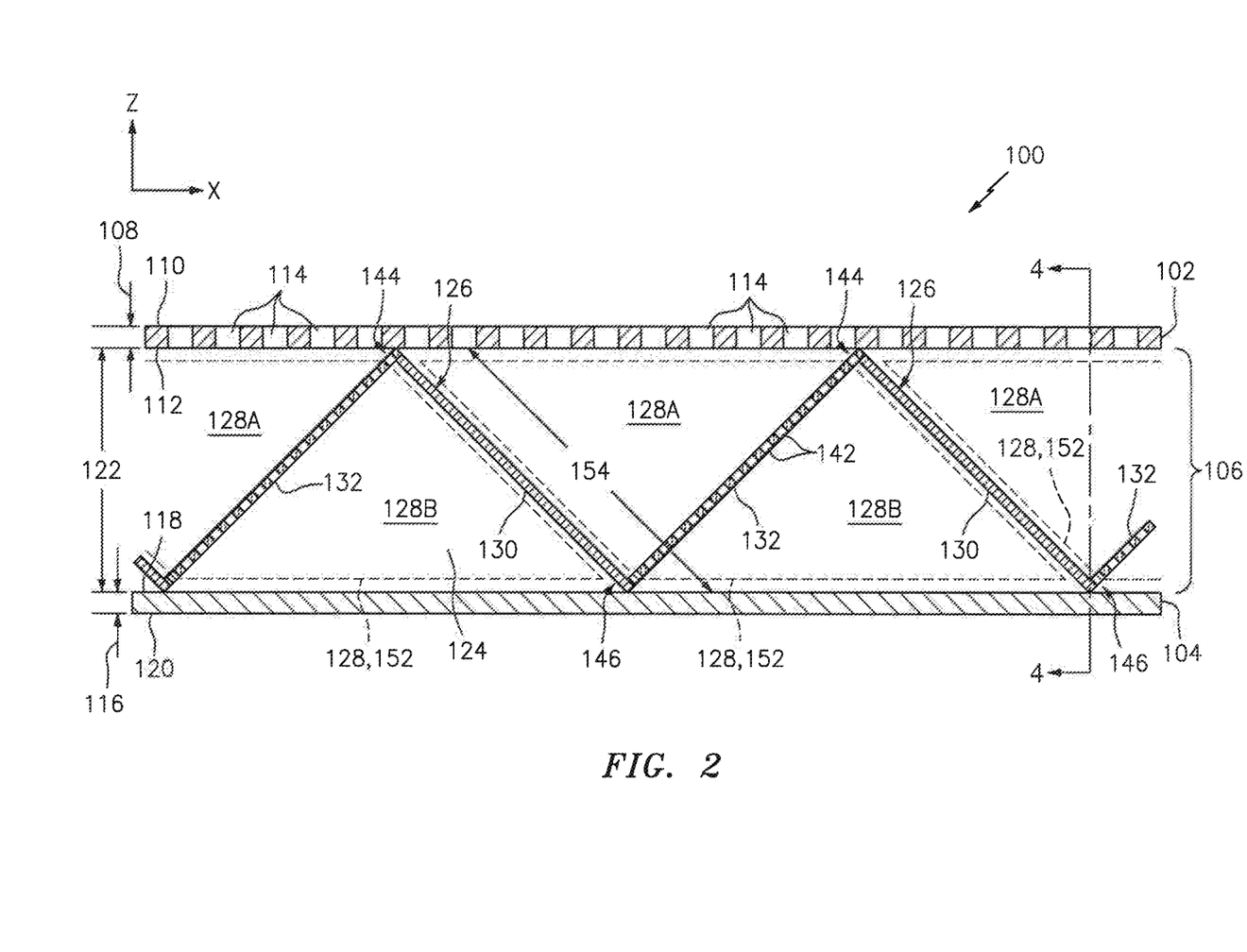
FIG. 2 is a first side sectional illustration of a portion of the structured panel, in accordance with various embodiments.

The first skin 102 may be configured as a relatively thin sheet or layer of material that extends longitudinally and laterally along the x-y plane. This first skin material may include, but is not limited to, a polymer, a fiber reinforced composite (e.g., fiberglass composite, carbon fiber composite, aramid fiber composite, composite reinforced by any combination of glass, carbon, aramid or other fibers, etc.), metal, alloys, metal matrix composite, ceramic, or ceramic matrix composite, or a combination thereof. Referring now to FIG. 2, the first skin 102 has a vertical thickness 108 that extends vertically between opposing side surfaces 110 and 112. The first skin 102 includes a plurality of perforations 114; e.g., apertures such as through-holes (see also FIG. 1). Each of these perforations 114 extends generally vertically through the first skin 102 between its side surfaces 110 and 112. The perforations 114 may be non-uniform through the thickness 108 and/or may be non-perpendicular to the side surfaces 110 and/or 112.

The second skin 104 may be configured as a relatively thin sheet or layer of (e.g., continuous and uninterrupted) material that extends longitudinally and laterally along the x-y plane (see FIG. 1). This second skin material may include, but is not limited to, a polymer, a fiber reinforced composite (e.g., fiberglass composite, carbon fiber composite, aramid fiber composite, composite reinforced by any combination of glass, carbon, aramid or other fibers, etc.), metal, alloys, metal matrix composite, ceramic, or ceramic matrix composite, or a combination thereof. The second skin material may be the same as or different than the first skin material. The second skin 104 has a vertical thickness 116 that extends vertically between opposing side surfaces 118 and 120. This vertical thickness 116 may be substantially equal to or different (e.g., greater or less) than the vertical thickness 108 of the first skin 102. The thickness 108 of the first skin 102 and/or the thickness 116 the second skin 104 may be uniform or non-uniform along the x-y plane.

Figure 3:
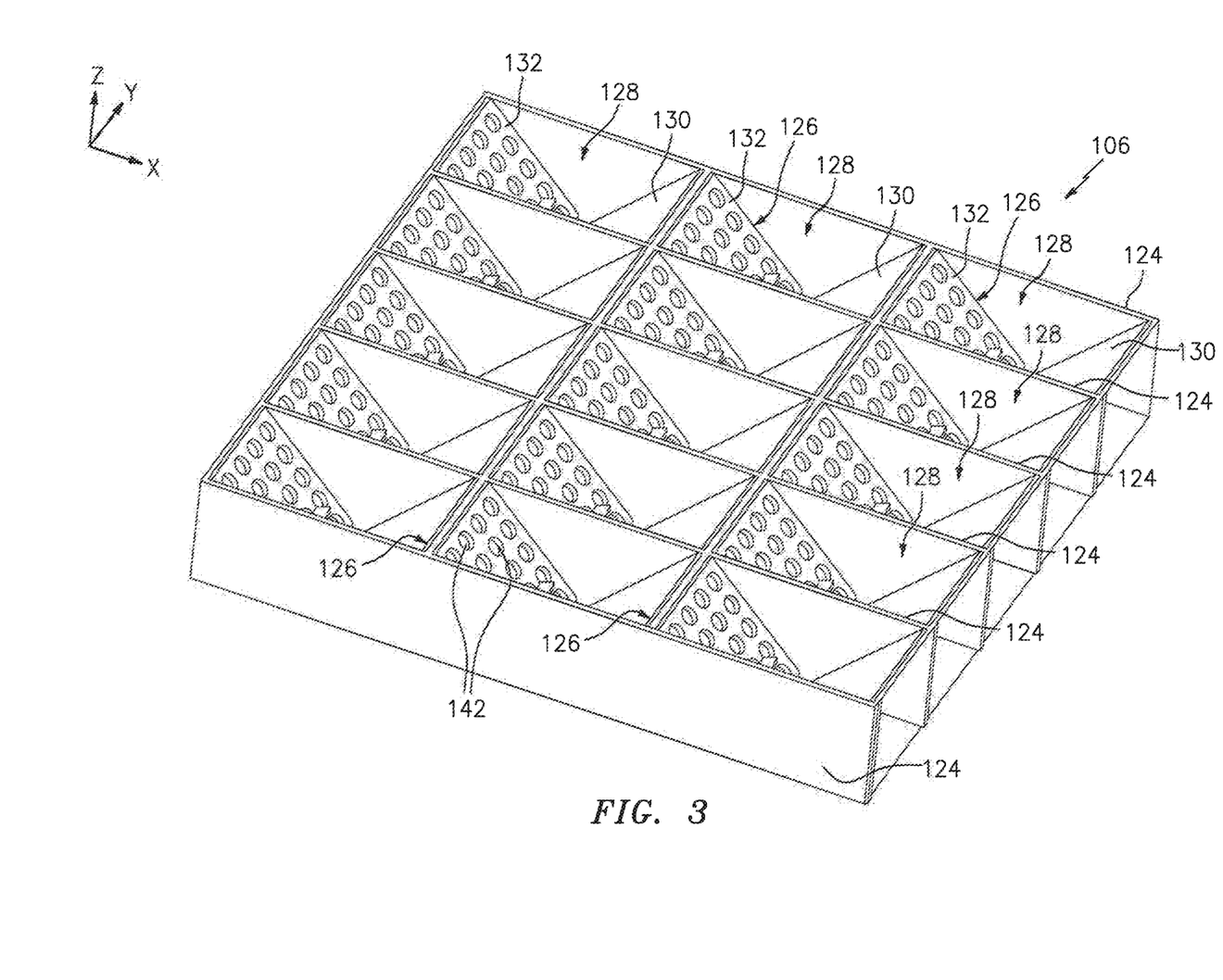
FIG. 3 is a perspective illustration of a cellular core of the structured panel portion, in accordance with various embodiments.

Referring to FIG. 3, the cellular core 106 extends longitudinally and laterally along the x-y plane. Referring again to FIG. 2, the cellular core 106 has a vertical thickness 122 that extends vertically between opposing core sides, which sides are respectively abutted against the first skin 102 and the second skin 104. The vertical thickness 122 may be substantially greater than the vertical thicknesses 108 and 116 of the first skin 102 and/or the second skin 104, respectively. The vertical thickness 122, for example, may be at least ten to forty times (10-40×), or more, greater than the vertical thicknesses 108, and 116; however, the acoustic panel 100 of the present disclosure is not limited to such an exemplary embodiment.

Figure 4:
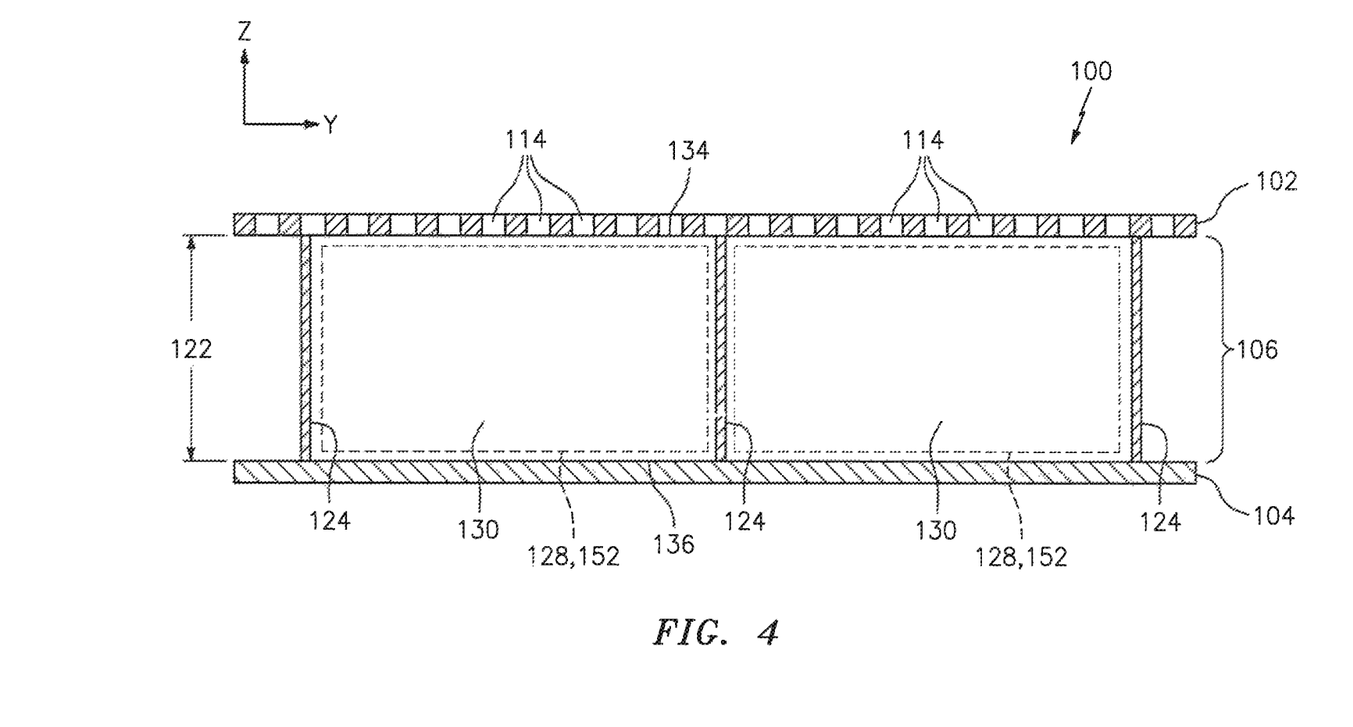
FIG. 4 is a second side sectional illustration of the structured panel portion, in accordance with various embodiments.

Referring to FIGS. 2-4, the cellular core 106 includes a plurality of solid non-perforated walls 124 (e.g., cavity sidewalls) and one or more arrays of corrugations 126. The walls 124 and corrugations 126 are arranged together to configure the cellular core 106 as an open cavity (e.g., open cell) structure. This open cavity structure forms a plurality of cavities 128 (each including divided sub-cavities 128A and 128B) vertically between the first skin 102 and the second skin 104. Each of these cavities 128 may be fluidly coupled with one or more respective perforations 114 in the first skin 102 (see FIG. 2).

Referring to FIG. 3, each of the walls 124 has a length that extends longitudinally along the x-axis. Each of the walls 124 has a thickness that extends laterally along the y-axis. Referring now to FIG. 4, each of the walls 124 has a height that extends vertically between the first skin 102 and the second skin 104.

Each of the walls 124 is, at least, partially (or completely) connected to or otherwise engaged with the first skin 102 and/or the second skin 104. Each of the exemplary walls 124 of FIG. 4 is orientated substantially perpendicular to the first skin 102 and the second skin 104; e.g., at a ninety-degree angle to the skins 102 and 104. However, in other embodiments, one or more of the walls 124 may be angularly offset from the first skin 102 and/or the second skin 104 by a non-ninety-degree angle; e.g., an acute included angle or an obtuse angle.

The walls 124 are arranged generally parallel with one another; see also FIG. 3. The walls 124 are laterally spaced from one another along the y-axis so as to respectively form the cavities 128 between the walls 124. Each of the walls 124 shown in FIG. 4 therefore respectively forms lateral sides of adjacent cavities 128 on either side of the respective wall 124. Each of the walls 124 thereby also fluidly separates those cavities 128 on either side of the wall 124.

Referring to FIG. 3, the corrugations 126 in each array are disposed and extend laterally between a laterally adjacent pair of the walls 124; see also FIG. 4. Each of the corrugations 126 includes a solid non-perforated baffle 130 and a porous (e.g., perforated) septum 132. In another exemplary embodiment, one or more or each of the corrugations 126 includes only porous (e.g. perforated) septa 132, or only solid non-perforated baffles 130 in an alternating periodic or non-periodic pattern along the y-axis or the x-axis or both.

Figure 5:
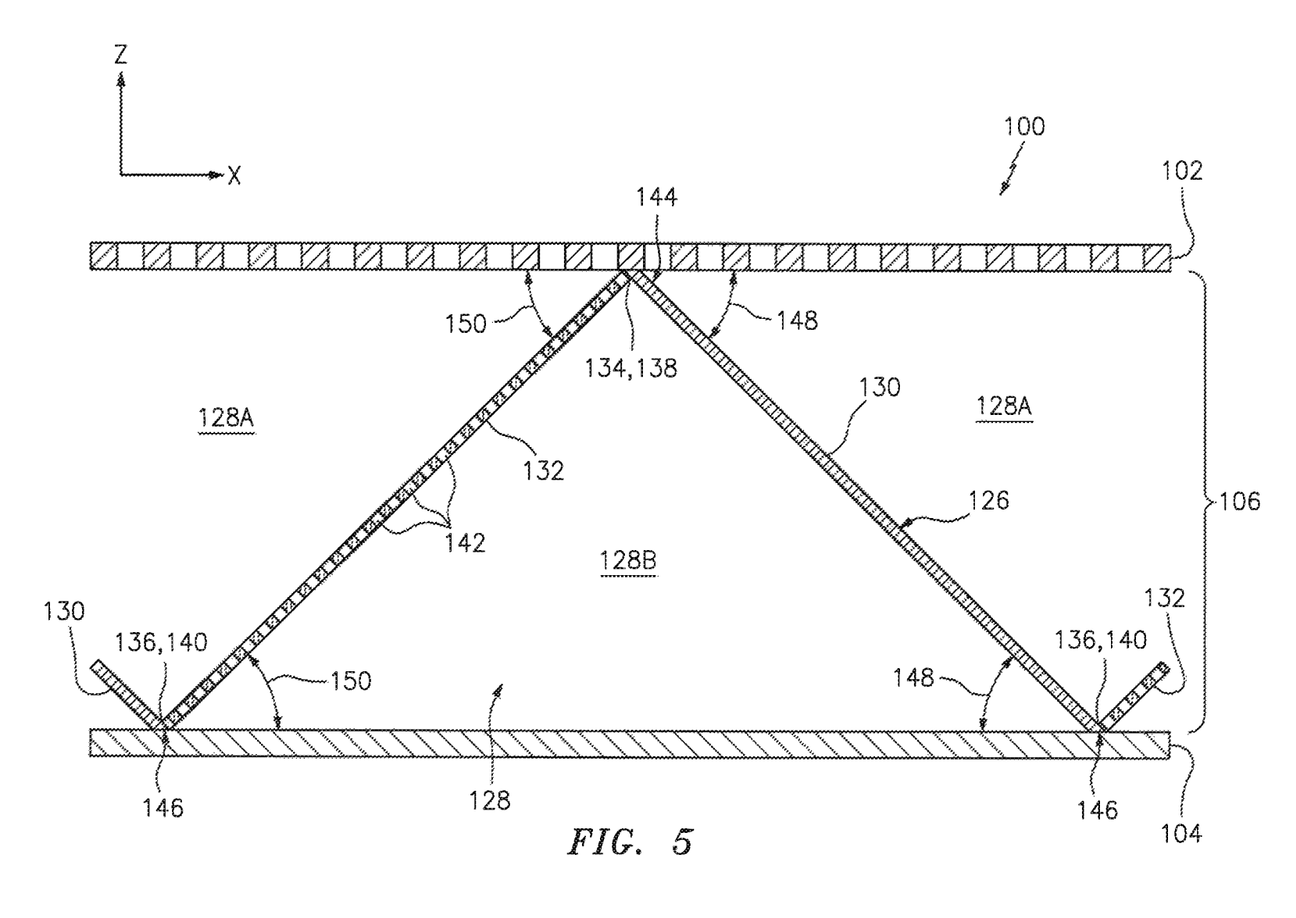
FIG. 5 is a partial enlarged view of the structured panel portion of FIG. 2, in accordance with various embodiments.

Referring to FIGS. 4 and 5, the baffle 130 has a width extending laterally between opposing lateral sides. These lateral sides are, at least, partially (or completely) connected to or otherwise engaged with a respective laterally adjacent pair of the walls 124. Referring to FIG. 5, the baffle 130 has a length extending vertically and longitudinally between opposing top and bottom ends 134 and 136. Note, the terms "top" and "bottom" are used above to describe ends of the baffle 130 as situated in the drawings and are not intended to limit the baffle 130 or the acoustic panel 100 to such an exemplary gravitational orientation.

The septum 132 has a width extending laterally between opposing lateral sides. These lateral sides are connected to or otherwise engaged with a respective laterally adjacent pair of the walls 124. The septum 132 has a length extending vertically and longitudinally between opposing top and bottom ends 138 and 140. Note, the terms "top" and "bottom" are used above to describe ends of the septum 132 as situated in the drawings and are not intended to limit the septum 132 or the acoustic panel 100 to such an exemplary gravitational orientation.

The septum 132 includes one or more perforations 142. In the exemplary embodiment of FIG. 5, the perforations 142 are configured as through holes. However, in other embodiments, the perforations 142 may be formed by interconnected pores in the septum 132 where the septum material, for example, has an open cell porous structure.

The top end 134 of the baffle 130 is connected, at least, partially (or completely) to or otherwise engaged with the first skin 102. This top end 134 is also longitudinally connected to the top end 138 of the septum 132 at an interface 144 between the baffle 130 and the septum 132. The bottom end 136 of the baffle 130 is connected to or otherwise engaged with the second skin 104. This bottom end 136 is also longitudinally connected to the bottom end 140 of a septum 132 of an adjacent one of the corrugations 126 at an interface 146. With the foregoing configuration, the baffle 130 extends vertically between the first skin 102 and the second skin 104 and longitudinally between the septums 132. The baffle 130 is therefore angularly offset from the first skin 102 and the second skin 104 by an included angle 148; e.g., between 30-60 degrees. This angle 148 is an acute angle such as, but not limited to, about forty-five degrees (45°).

The top end 138 of the septum 132 is, at least, partially (or completely) connected to or otherwise engaged with the first skin 102. This top end 138 is also longitudinally connected to the top end 134 of the baffle 130 as described above. The bottom end 140 of the septum 132 is, at least, partially (or completely) connected to or otherwise engaged with the second skin 104. This bottom end 140 is also longitudinally connected to the bottom end 136 of a baffle 130 of an adjacent one of the corrugations 126 at an interface; e.g., the interface 146. With the foregoing configuration, the septum 132 extends vertically between the first skin 102 and the second skin 104 and longitudinally between the baffles 130.

Figure 6:
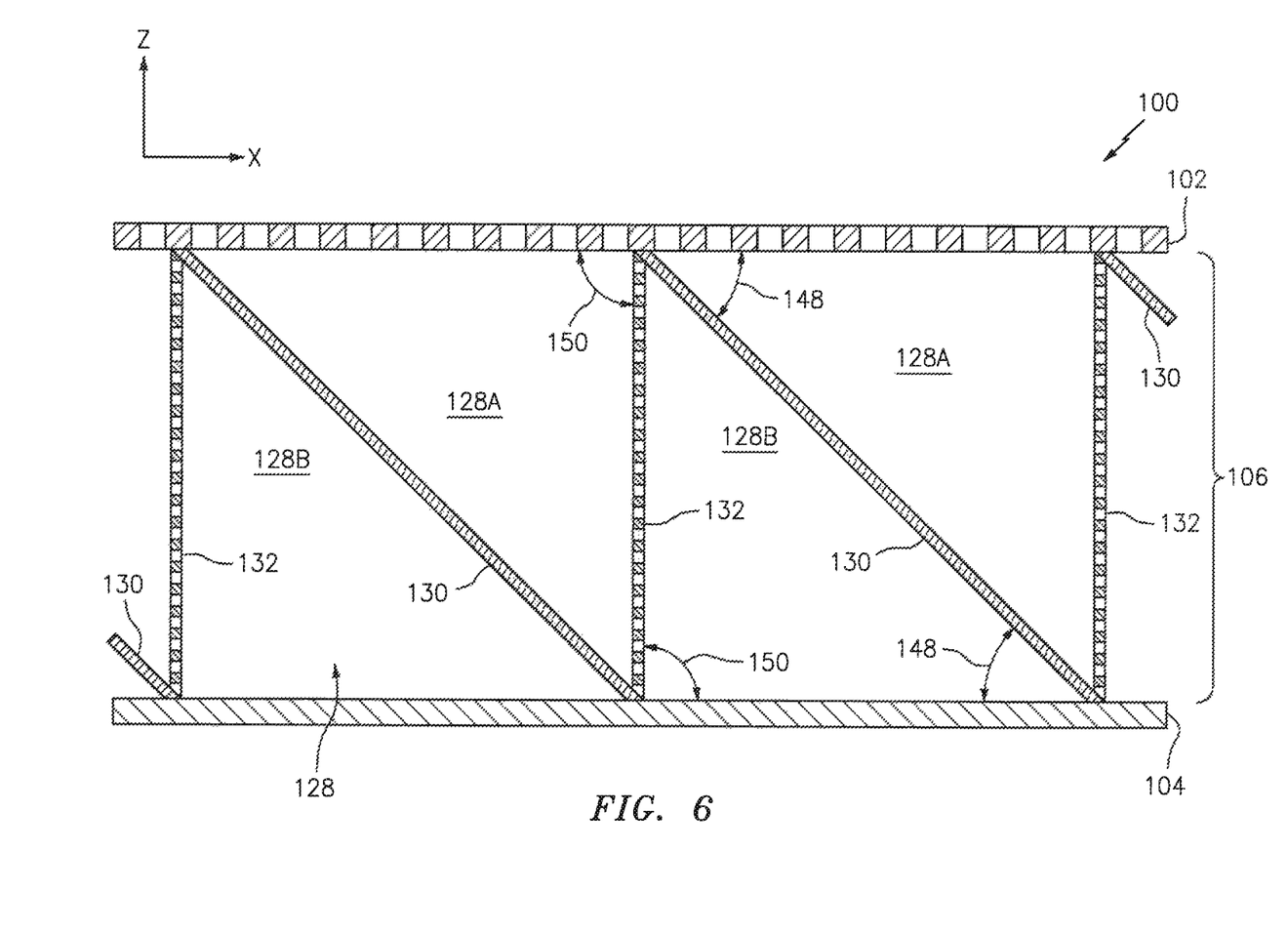
FIG. 6 is a first side sectional illustration of a portion of another structured panel, in accordance with various embodiments.

The septum 132 is therefore angularly offset from the first skin 102 and the second skin 104 by an included angle 150; e.g., between 30-60 degrees. This angle 150 may be an acute angle such as, but not limited to, about forty-five degrees (45°). The angle 150 may be substantially equal to the angle 148 as shown in FIG. 5. Alternatively, the angle 150 may be different from the angle 148; e.g., a larger or smaller acute angle, or a right angle. For example, the angle 150 may be about ninety degrees and the angle 148 may be about forty-five degrees as shown in FIG. 6.

Referring to FIG. 2, each of the cavities 128 extends longitudinally between and is formed by a longitudinally adjacent pair of the baffles 130. Each septum 132 is disposed within and divides a respective one of the cavities 128 into fluidly coupled sub-cavities 128A and 128B. More particularly, the perforations 142 in the septum 132 fluidly couple the sub-cavities 128A and 128B together.

Each of the cavities 128 forms a resonance chamber 152. A length 154 of the resonance chamber 152 extends diagonally (e.g., longitudinally and vertically) between the first skin 102 and the second skin 104 and through a respective one of the septums 132. The length 154 of the resonance chamber 152 therefore is longer than the vertical thickness 122 of the cellular core 106. This enables noise attenuation of relatively low frequency noise without increasing the vertical thickness 152 of the cellular core 106 and, thus, a vertical thickness of the acoustic panel 100. For example, each resonance chamber 152 may receive noise waves through the perforations 114 in the first skin 102. The resonance chamber 152 may reverse the phase of one or more frequencies of those sound waves using known acoustic reflection principles and subsequently direct the reverse phase sound waves out of the acoustic panel 100 through the perforations 114 to destructively interfere with other incoming noise waves.

The cellular core 106 may be constructed from any suitable material or materials. The cellular core 106, for example, may be constructed from a polymer, a fiber reinforced composite (e.g., fiberglass composite, carbon fiber composite, aramid fiber composite, composite reinforced by any combination of glass, carbon, aramid or other fibers), metal, alloys, metal matrix composite, ceramic, or ceramic matrix composite, or a combination thereof. One or more of components of the cellular core 106 may be constructed from the same or a like material. Alternatively, one or more of the components of the cellular core 106 may be constructed from a different material than one or more of the other components of the cellular core 106. Furthermore, the cellular core 106 may be constructed from the same material(s) as the first skin 102 and/or the second skin 104, or a different material or materials.

As described above, one or more elements of the acoustic panel 100 may be configured with one or more structural reinforcements. These structural reinforcements are provided to increase rigidity, stability, strength and/or structural integrity of the corresponding element(s) as well as the acoustic panel 100 as a whole. Examples of the one or more elements include, but are not limited to: (A) one, some or each of the baffles 130; (B) one, some or each of the septums 132; and (C) one, some or each of the walls 124. One or more structural reinforcements, of course, may also or alternatively be configured with one or more other elements of the acoustic panel 100. For example, one or more structural elements may be configured with the first skin 102 and/or the second skin 104.

Figure 7:
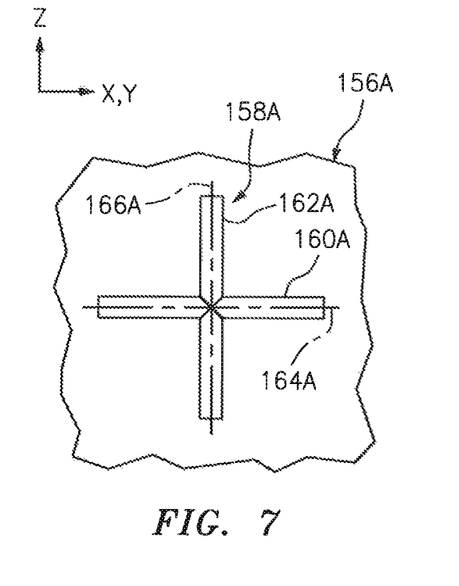
FIG. 7 is an illustration of a portion of a structured panel element configured with a structural reinforcement, in accordance with various embodiments.
Figure 8:
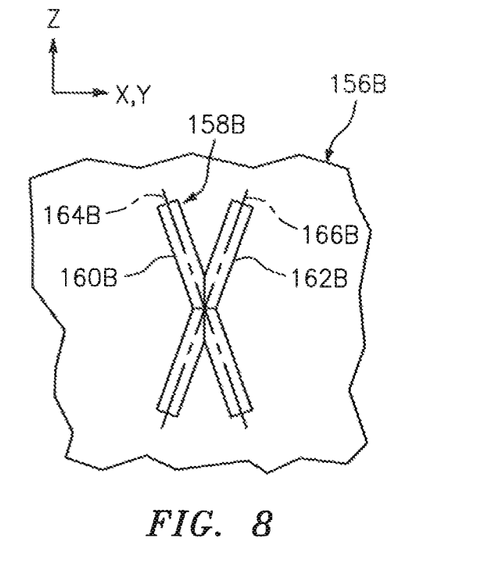
FIG. 8 is an illustration of a portion of a structured panel element configured with another structural reinforcement, in accordance with various embodiments.

FIG. 7 illustrates a portion of an acoustic panel element 156A configured with a first exemplary structural reinforcement 158A. The acoustic panel element 156A can be one or more of the walls 124, or the corrugations 126, or both, or combinations thereof. In another exemplary case the acoustic panel element 156A can be the first skin 102, or the second skin 104, or both, or combinations thereof in part or in their entirety. The structural reinforcement 158A is configured as or otherwise includes a network of interconnected ribs. In particular, the structural reinforcement 158A of FIG. 7 includes a first rib 160A and a second rib 162A, where each rib 160A, 162A may be a stamped and/or otherwise formed element (e.g., protrusion) that projects out from a respective surface/side of the acoustic panel element 156A. The first rib 160A extends along a first trajectory 164A and the second rib 162A extends along a second trajectory 166A. Note, the term "trajectory" may describe a centerline that follows along a length of a feature, where that length is greater than other dimensions (e.g., a width and/or a thickness) of the feature. The first trajectory 164A and the second trajectory 166A are straight-line trajectories; however, in other embodiments, one or both of these trajectories 164A and 166A may alternatively be curved or otherwise convoluted line trajectories. The first trajectory 164A of the first rib 160A is non-parallel with the second trajectory 166A of the second rib 162A. The first trajectory 164A and the first rib 160A of FIG. 7, for example, are perpendicular and coincident with the second trajectory 166A and the second rib 162A. Of course, in other embodiments, an included angle between the first and the second trajectories 164B and 166B and ribs 160B and 162B of the structural reinforcement 158B on the acoustic panel element 156B may be acute (or obtuse) as shown in FIG. 8 for example. Referring again to FIG. 7, the first rib 160A intersects and thereby runs into the second rib 162A. The first rib 160A of FIG. 7, for example, bisects the second rib 162A and the second rib 162A bisects the first rib 160A.

When loads are applied to the acoustic panel element 156A portion of FIG. 7, the first rib 160A may serve to minimize risk of bending/buckling of the acoustic panel element 156A portion along an axis running parallel or acutely angled relative to its first trajectory 164A. Similarly, the second rib 162A may serve to minimize risk of bending/buckling of the acoustic panel element 156A portion along an axis running parallel or acutely angled relative to its second trajectory 166A. Thus, by providing the intersecting first and second ribs 160A and 162A, the rigidity, stability, strength and/or structural integrity of the element 156A in the plane of the acoustic panel element 156A portion may be increased.

Figure 9:
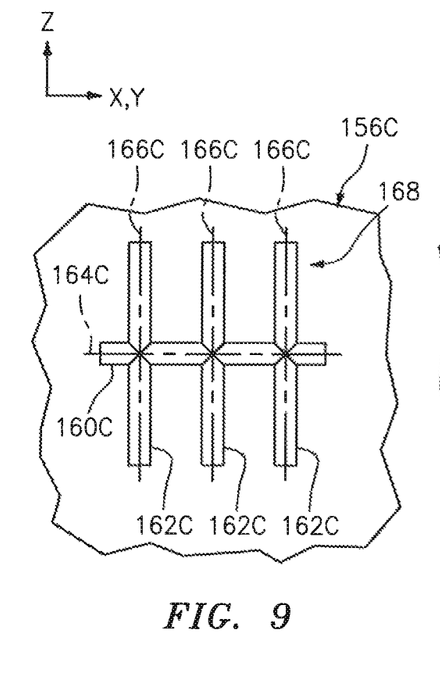
FIG. 9 is an illustration of a portion of a structured panel element configured with another structural reinforcement, in accordance with various embodiments.

FIG. 9 illustrates another acoustic panel element 156C portion configured with a second exemplary structural reinforcement 168. This structural reinforcement 168 includes the first rib 160C and a plurality of the second ribs 162C; however, a similar arrangement may be made with a single second rib 162C and a plurality of the first ribs 160C in other embodiments. Note, the terms "first" and "second" are used to describe the ribs in order of introduction; thus, the first ribs 160C may include a first rib 160C, a second rib 160C, a third rib 160C, etc. and the second ribs 162C may include a first rib 162C, a second rib 162C, a third rib 160C, etc. The second trajectories 166C of the second ribs 162C may be parallel (or substantially parallel; e.g., up to one to ten degrees offset) with one another and, thus, non-parallel with the first trajectory 164C. The included angles between the first and the second trajectories 164C and 166C and ribs 160C and 162C of the structural reinforcement 168 on the acoustic panel element 156C may be 90°, or acute, or obtuse. The first rib 160C may bisect each or some of the second ribs 162C.

Figure 10:
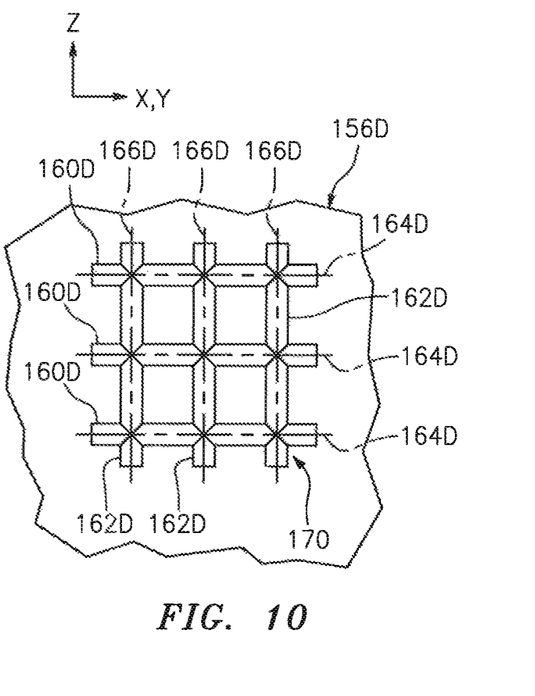
FIG. 10 is an illustration of a portion of a structured panel element configured with another structural reinforcement, in accordance with various embodiments.

FIG. 10 illustrates another acoustic panel element 156D portion configured with a third exemplary structural reinforcement 170. This structural reinforcement 170 includes a plurality of the first ribs 160D and a plurality of the second ribs 162D. Note, the terms "first" and "second" are used to describe the ribs in order of introduction; thus, the first ribs 160D may include a first rib 160D, a second rib 160D, a third rib 160D, etc. and the second ribs 162D may include a first rib 162D, a second rib 162D, a third rib 160D, etc. The first trajectories 164D of the first ribs 160D may be parallel (or substantially parallel; e.g., up to one to five degrees offset) with one other. The second trajectories 166D of the second ribs 162D may be parallel with one another and, thus, non-parallel with the first trajectories 164D. This configuration of first and second ribs 160D and 162D is in the form of a grid. Each of the first ribs 160D may intersect each or some of the second ribs 162D, and each of the second ribs 162D may intersect each or some of the first ribs 160D. The included angles between the first and the second trajectories 164D and 166D and ribs 160D and 162D of the structural reinforcement 170 on the acoustic panel element 156D may be 90°, acute, or obtuse.

Figure 11:
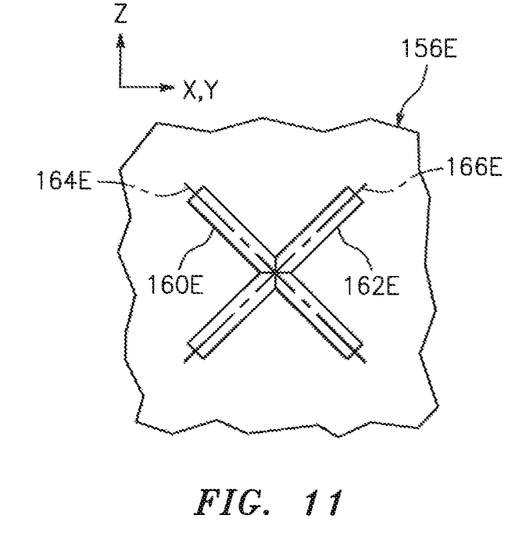
FIG. 11 is an illustration of a portion of a structured panel element configured with still another structural reinforcement, in accordance with various embodiments.

In the exemplary embodiments of FIGS. 7, 8, 9 and 10, the first ribs 160A, 160B, 160C, 160D (generally referred to as "160") run right-and-left and the second ribs 162A, 162B, 162C, 162D (generally referred to as "162") run up-and-down relative to the acoustic panel element 156A, 156B, 156C, 156D (generally referred to as "156") portion. Of course, any of these exemplary structural reinforcements may be reoriented such that the second ribs 162 run right-and-left and the first ribs 160 run up-and-down relative to the acoustic panel element 156 portion. Still alternatively, any of the exemplary structural reinforcements may be reoriented such that the first and the second ribs 160 and 162 run diagonally or along another angle relative to the acoustic panel element 156 portion. For example, referring to the structural reinforcement on the acoustic panel element 156E of FIG. 11, the first rib 160E runs along the first trajectory 164E diagonally from a top-left end to a bottom-right end. The second rib 162E runs along the second trajectory 166E diagonally from a top-right end to a bottom-left end.

Figure 12:
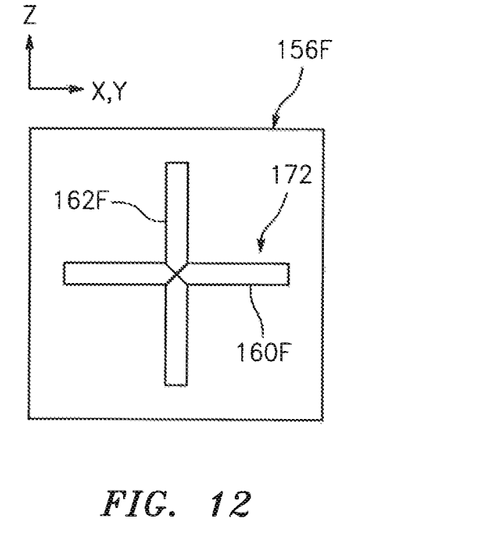
FIG. 12 is an illustration of a structured panel element configured with a single structural reinforcement, in accordance with various embodiments.
Figure 13:
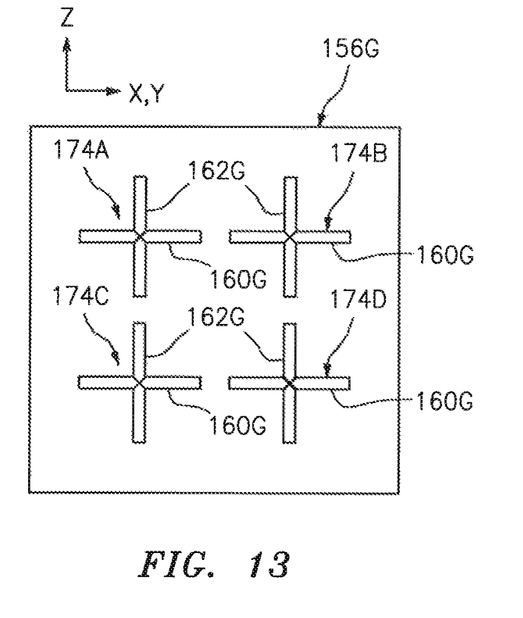
FIG. 13 is an illustration of a structured panel element configured with a plurality of structural reinforcements, in accordance with various embodiments.
Figure 14:
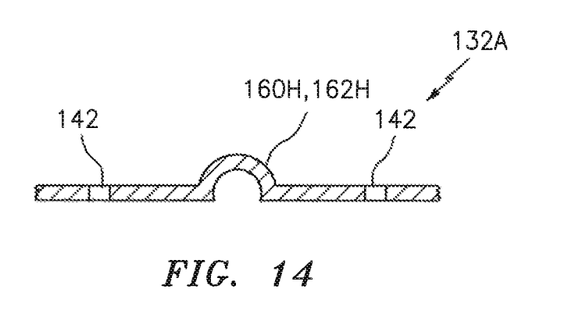
FIG. 14 is a sectional illustration of a portion of a septum configured with a structural reinforcement rib, in accordance with various embodiments.
Figure 15:
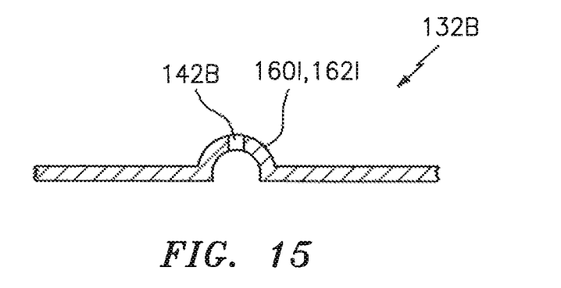
FIG. 15 is a sectional illustration of a portion of another septum configured with a structural reinforcement rib, in accordance with various embodiments.
Figure 16:
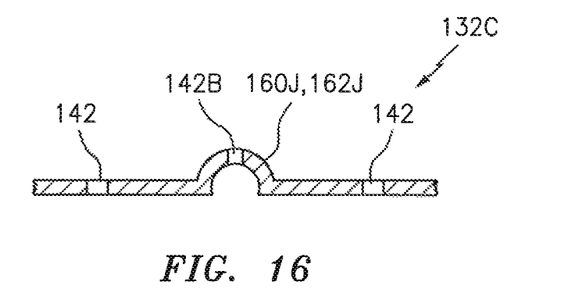
FIG. 16 is a sectional illustration of a portion of still another septum configured with a structural reinforcement rib, in accordance with various embodiments.
Figure 17:
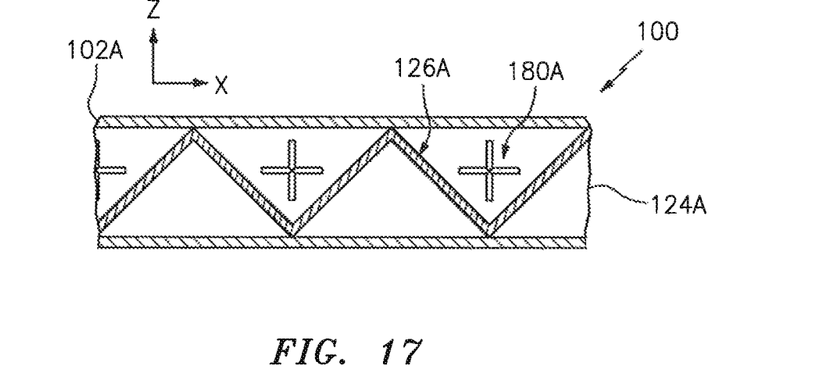
FIGS. 17-19 are first side sectional illustrations of alternative structural panels having structural reinforcements configured with its wall, in accordance with various embodiments.
Figure 18:
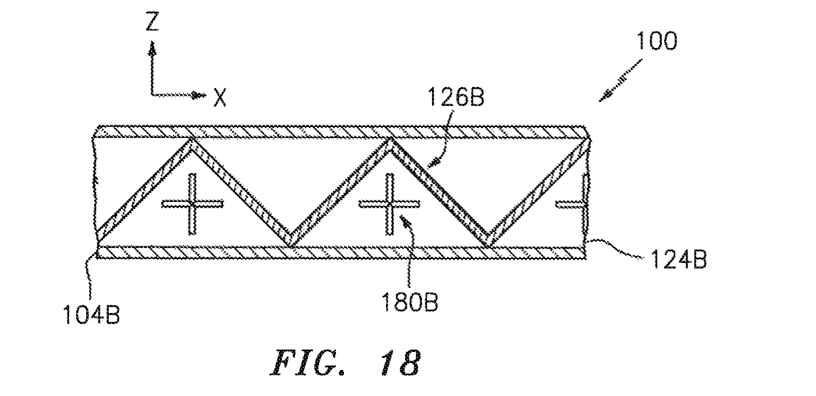
Figure 19:
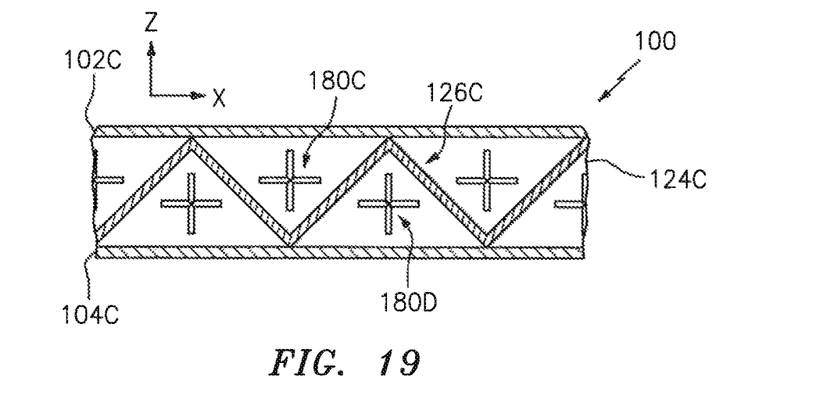

In some embodiments, a respective acoustic core element 156F may be configured with a single structural reinforcement 172 (e.g., any of the afore-described structural reinforcements 158A, or 158B, or 168, or 170), for example as shown in FIG. 12. In other embodiments, a respective acoustic core element 156G may be configured with a plurality of discrete structural reinforcements 174A-D (e.g., any of the afore-described structural reinforcements 158A, or 158B, or 168, or 170), for example as shown in FIG. 13. As described above, each structural reinforcement 172, 174A-D of FIGS. 12 and 13 may include respective ribs 160F, G and 162F, G, respectively. In the embodiment of FIG. 13, the ribs 160G and 162G of the structural reinforcement 174A are discrete (e.g., do not intersect or touch) any of the other structural reinforcements 174B-D or their respective ribs.

Where a structural reinforcement is configured with a septum 132A, one, some or each of the ribs (e.g., 160H, 162H) of the structural reinforcement may be non-perforated, for example as shown in FIG. 14. In other embodiments, however, one, some or each of the ribs (e.g., 160I, 160J, 162I, 162J) of the structural reinforcement may be perforated (142B), for example as shown on the septums 132B and 132C in FIGS. 15 and 16. The perforations 142 may also be included on portions of the septum 132C not occupied by (e.g., adjacent to and around) the ribs (e.g., 160, 162), for example as shown in FIGS. 16 and 14.

Where one or more structural reinforcements are configured with a wall 124A, the structural reinforcements 180A may be located (e.g., only vertically) between the corrugations 126A and the first skin 102A, for example as shown in FIG. 17. In other embodiments, the structural reinforcements 180B may be located (e.g., only vertically) between the corrugations 126B and the second skin 104B, for example as shown in FIG. 18. In still other embodiments, the structural reinforcements 180C and 180D may be located both (e.g., vertically) between the corrugations 126C and the first skin 102C as well as (e.g., vertically) between the corrugations 126C and the second skin 104C.

Figure 20:
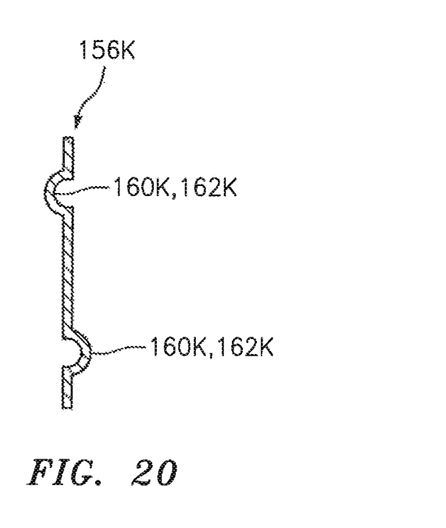
FIG. 20 is a section illustration of a portion of a structured panel element configured with a plurality of structural reinforcement ribs, in accordance with various embodiments.

In some embodiments, ribs of a structural reinforcement (or reinforcements) may be arranged on a common side of the acoustic panel portion as generally shown in the figures discussed above. In other embodiments, the ribs (e.g., 160K, 162K) of the acoustic panel element 156K may be arranged on opposing sides of the acoustic panel portion, for example as shown in FIG. 20.

Figure 21:
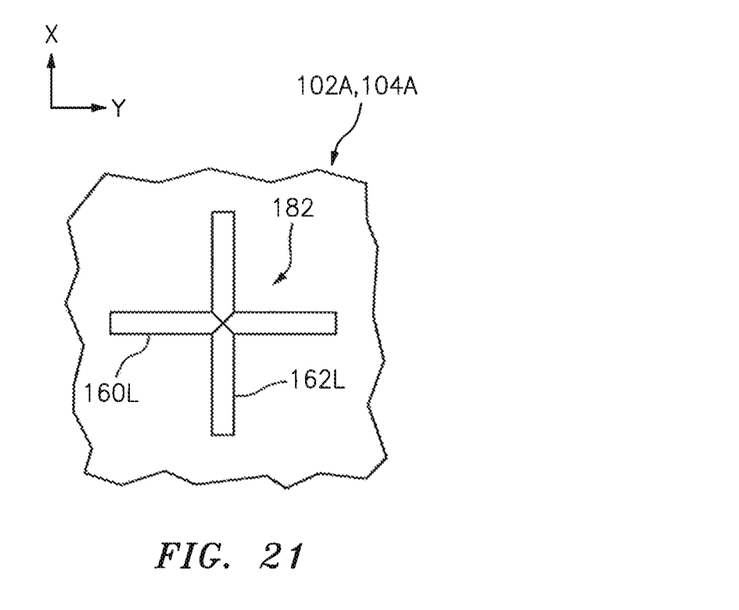
FIG. 21 is an illustration of another structured panel element configured with a structural reinforcement, in accordance with various embodiments.

In some embodiments, the first skin 102 and/or the second skin 104 may each be configured with one or more of the structural reinforcements described above. For example, the skin 102A, 104A of FIG. 21 includes at least one structural reinforcement 182, which includes at least one first rib 160L and at least one second rib 162L. In one embodiment the perforations 114 through the first skin 102A are not included on portions of the ribs 160L and 162L. In another embodiment the perforations 114 through the first skin 102A are included on portions of the ribs 160L and 162L.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A panel for attenuating sound, comprising:
   a perforated first skin;
   a second skin; and
   a core forming a plurality of cavities vertically between the perforated first skin and the second skin, the core including an array of corrugations that include a first baffle, a second baffle and a first septum;
   the cavities including a first cavity formed longitudinally between the first baffle and the second baffle, and the first cavity fluidly coupled with perforations in the first skin; and
   the first septum extending from the first skin and the first baffle to the second skin and the second baffle, and the first septum dividing the first cavity into fluidly coupled sub-cavities;
   wherein at least one element of the panel comprises at least one first rib and at least one second rib, the first rib extends along a first trajectory and the second rib extends along a second trajectory that is non-parallel with the first trajectory.

2. The panel of claim 1, wherein the first trajectory is offset from the second trajectory by an acute angle.

3. The panel of claim 1, wherein the first trajectory is perpendicular to the second trajectory.

4. The panel of claim 1, wherein the first rib runs into the second rib.

5. The panel of claim 1, wherein the first rib is discrete from the second rib.

6. The panel of claim 1, wherein
the element of the panel further comprises at least one third rib; and
the third rib extends along a third trajectory that is non-parallel with the first trajectory.

7. The panel of claim 6, wherein the third trajectory is parallel with the second trajectory.

8. The panel of claim 6, wherein the second rib and the third rib are each coincident with the first rib.

9. The panel of claim 6, wherein
the element of the panel further comprises a fourth rib; and
the fourth rib extends along a fourth trajectory that is non-parallel with the second trajectory.

10. The panel of claim 9, wherein the first rib and the fourth rib each intersect with the second rib and the third rib.

11. The panel of claim 1, wherein the element of the panel comprises an element of the core.

12. The panel of claim 1, wherein the element of the panel comprises the first baffle.

13. The panel of claim 1, wherein the element of the panel comprises the septum.

14. The panel of claim 1, wherein the element of the panel comprises the first skin.

15. The panel of claim 1, wherein the element of the panel comprises the second skin.

16. The panel of claim 1, wherein
the core further comprises a first wall and a second wall;
the first cavity is formed laterally between the first wall and the second wall; and
the element of the panel comprises the first wall.

17. The panel of claim 1, wherein the core comprises composite material.

18. The panel of claim 1, wherein the panel is configured as a panel for a nacelle of an aircraft propulsion system.

19. A panel for attenuating sound, comprising:
a plurality of panel elements comprising a perforated first skin, a second skin and a core, at least one of the panel elements comprising a network of interconnected ribs;
the core forming a plurality of cavities vertically between the perforated first skin and the second skin, the core including an array of corrugations that include a first baffle, a second baffle and a first septum;
the cavities including a first cavity formed longitudinally between the first baffle and the second baffle, and the first cavity fluidly coupled with perforations in the first skin;
the first septum extending from the first skin and the first baffle to the second skin and the second baffle, and the first septum dividing the first cavity into fluidly coupled cub-cavities; and
the network of interconnected ribs comprising a first rib and a second rib that intersects the first rib within the first cavity.

20. A panel for attenuating sound, comprising:
a perforated first skin;
a second skin;
a core forming a plurality of cavities vertically between the perforated first skin and the second skin, the core including an array of corrugations that include a first baffle, a second baffle and a first septum;
the cavities including a first cavity formed longitudinally between the first baffle and the second baffle, and the first cavity fluidly coupled with perforations in the first skin; and
the first septum extending from the first skin and the first baffle to the second skin and the second baffle, and the first septum dividing the first cavity into fluidly coupled sub-cavities;
wherein at least one element of the core comprises a network of interconnected ribs, and the network of interconnected ribs comprises a first rib and a second rib that intersects the first rib within the first cavity.

* * * * *

UNITED STATES PATENT AND TRADEMARK OFFICE
CERTIFICATE OF CORRECTION

| | | |
|---|---|---|
| PATENT NO. | : 10,906,659 B2 | Page 1 of 1 |
| APPLICATION NO. | : 15/943963 | |
| DATED | : February 2, 2021 | |
| INVENTOR(S) | : Gurvich et al. | |

It is certified that error appears in the above-identified patent and that said Letters Patent is hereby corrected as shown below:

In the Claims

Column 12, Line 18, please delete "cub-cavities" and insert --sub-cavities--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*